Patented Jan. 20, 1942

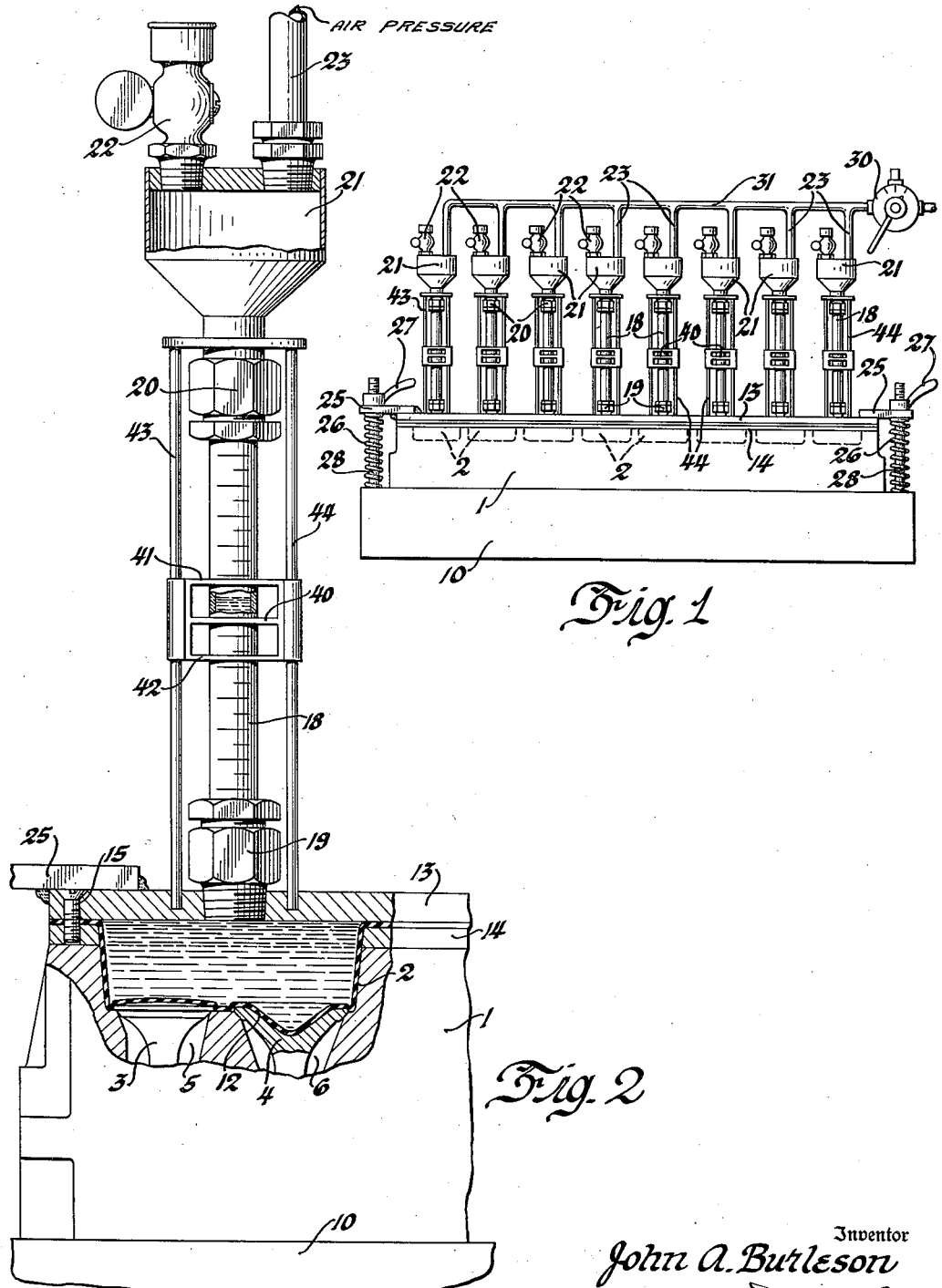

2,270,505

UNITED STATES PATENT OFFICE 2,270,505

VOLUME CHECKING FIXTURE

John A. Burleson, Flint, Mich., assignor to General Motors Corporation, Detroit, Mich., a corporation of Delaware Application April 9, 1941, Serial No. 387,715

6 Claims. (Cl. 73—51)

This invention relates to a device for measuring the volume of a chamber and particularly an irregular chamber, the volume of which cannot readily be calculated.

It relates more specifically to a device for checking, comparing, and measuring the volumes of the combustion chambers of an internal combustion engine.

The irregular surfaces of combustion chambers are ordinarily not machined, but it is highly desirable, especially in modern high compression engines using high octane fuel, that they should have a given volume, and that all the combustion chambers of similar cylinders in a given engine, and all such engines, should be equal in volume, within limits. If the volume of any combustion chamber is not within the desired limits, it can easily be made so, either by subtraction or addition of material thereto.

While it might be possible to fill a combustion chamber with a liquid such as water and then pour it out into a graduated measure to check the volume of the combustion chamber, such a method would at best be highly inconvenient and insufficiently accurate, due to wetting losses, even if it could be performed with sufficient speed to be a practicable method of checking a large number of similar combustion chambers.

The object of the invention is a device for measuring the volumes of irregular chambers by the volume of liquid they will contain, the liquid being permanently contained within the device, and at no time being directly in contact with the walls of the chambers, so that it is never lost.

Another object of the invention is a device for measuring the volume of an irregular chamber by the excess of a known volume of liquid in a container, over that contained in a portion of the container which has been distended to conform to the contour of the chamber.

Another object of the invention is a device for simultaneously checking, measuring and comparing the volumes of all the combustion chambers of a multi-cylinder internal combustion engine.

The above and other objects of the invention will be apparent as the description proceeds.

According to the invention, the volume measuring liquid is contained in a container having a portion constituted by a rubber diaphragm distensible to conform to the contour of the chamber whose volume is to be measured, the liquid is of known volume in excess of the volume of the chamber, and the pressure of compressed air at a suitable pressure on the surface of the liquid, is used to distend the distensible portion of the container into conformation with the contour of the chamber, and fill it; the volume of the excess quantity of liquid in the container, as measured by volumetric graduations on the device, above the distensible portion, being a measure of the volume of the distended portion of the container and hence of the chamber. For simultaneously comparing the volumes of the combustion chambers in the cylinder head of a multi-cylinder engine, a plurality of such identical measuring devices, equal in number to the number of combustion chambers in the cylinder head, is used.

The drawing shows the application of the invention to the checking and measuring of the combustion chambers in the cylinder head of an overhead valve engine.

In the drawing

Figure 1 is an elevational view, showing eight of the devices arranged for checking and comparing the combustion chambers in the cylinder head of an eight cylinder, valve-in-head engine.

Figure 2 is an enlarged part sectional view of one of the devices.

The cylinder head 1, in which there are eight combustion chambers such as 2, with valves such as 3 and 4 closing the inlet and exhaust ports 5 and 6, is supported in an inverted position on a stand 10.

Each volume checking device comprises a liquid container including a distensible rubber diaphragm 12 having its edges clamped between a mounting plate 13 and a clamping plate 14 by screws such as 15.

Also included in each container is a graduated glass tube 18 with fittings 19 and 20, connecting the space between the distensible rubber diaphragm and the mounting plate with a closed fluid reservoir 21 provided with a filling cock 22 for water or other suitable liquid, and a pipe 23 for air at a suitable controlled pressure from a source of supply (not shown).

The mounting plate 13, with the volume checking device or devices secured thereto, is placed in proper position over the chambers in the cylinder head or other part containing the chamber or chambers to be measured, and the assembly is clamped together and to the stand 10 by quickly releasable clamping means such as the plates 25, resiliently held by springs 26 against wing nuts 27 on bolts 28 on which they are slidable and turnable.

A known quantity of colored water or other suitable liquid in excess of the volume of the chamber to be measured, is poured through the filling cock 22 into each container consisting of the distensible portion 12, the graduated glass tube 18, and the reservoir 21 of each device.

When there are several such devices for checking and comparing like chambers, like quantities of liquid are poured into each container.

The glass tubes are graduated in units of cubic measurement above the bottom of the plate 13, and the difference between the volume of liquid in the graduated glass tube and the known quantity of liquid put into the container is the volume of the liquid in the distensible diaphragm portion of the container.

If the distensible diaphragm portion of the container has been distended to conform with the contour of the chamber, the volume of the liquid in the distensible diaphragm portion, plus the volume of the rubber of the diaphragm itself, is the actual volume of the chamber.

To insure that the diaphragm is distended to conform with the contour of the chamber to be measured, compressed air at a suitable pressure (50 lbs. per square inch in the example illustrated) is admitted above the liquid in the container through the pipe 23. Any suitable means (which might be a three-way valve 30 in a line 31 common to the pipes 23) can be used to apply the air pressure while readings are being taken, and to relieve the pressure on the liquid in the devices at all other times.

More particularly to aid in comparing the volumes of the chambers with some fixed standard, or their relative volumes with each other, the graduated glass tube 18 is provided with an index slide 40, having in addition "low" and "high" volume limit marks 41 and 42. The index slide is movable over the length of the graduated glass tube on index slide guides 43 and 44, to the proper level of the known volume of liquid in the glass tube portion of the container after the diaphragm portion has been distended to conform with the contour of the chamber to be measured. The "high" and "low" limit marks 41 and 42 on the index slide readily indicate whether or not the chamber volume is within the desired limits.

I claim:

1. In a device for measuring the volume of a chamber, a liquid container having a portion distensible to conform to the contour of the chamber, a known quantity of liquid in the container, said quantity being in excess of the volume of the chamber, means whereby the liquid may be placed under pressure to distend the distensible portion of the container into conformation with the contour of the chamber and fill it, and means above the distensible portion for indicating the volume of the excess quantity of liquid in the container; the remaining volume of the known quantity of liquid being the required volume of the distended portion of the container, and hence of the chamber.

2. The combination according to claim 1, in which the distensible portion of the container consists of a rubber diaphragm.

3. The combination according to claim 1, in which the means above the distensible portion for indicating the volume of the excess quantity of liquid comprises a part of the liquid container, and is provided with suitable volumetric graduations.

4. The combination according to claim 1, in which the liquid in the container is placed under pressure by compressed air from a suitable source of supply having a connection to the container above the liquid level therein.

5. In a device for comparing the volumes of the combustion chambers in a cylinder head, a gang of liquid containers equal in number to the number of combustion chambers in said head, each of said liquid containers having a like portion distensible to conform to the contours of said chambers and containing known quantities of liquid in excess of the volumes of said chambers, said containers being disposed with their distensible portions in the respective chambers, means whereby the liquid in the respective containers may be placed under pressure to distend the distensible portion of the containers into conformation with the contours of the respective chambers to fill them, and means for measuring any difference between the volumes of said chambers by the volumes of the excess quantities of liquid in said containers.

6. In a device for comparing the volumes of the combustion chambers in a cylinder head, liquid containers equal in number to the number of combustion chambers in said head, each of said liquid containers having a like portion distensible to conform to the contours of said chambers and containing equal quantities of liquid in excess of the volumes of said chambers, said containers being disposed with their distensible portions in the respective chambers, means whereby the liquid in the respective containers may be placed under pressure to distend the distensible portion of the containers into conformation with the contours of the respective chambers to fill them, and means for indicating any difference between the volumes of said chambers by the levels of the excess quantities of liquid in said containers.

JOHN A. BURLESON.